(12) United States Patent
Sundholm

(10) Patent No.: US 7,284,507 B2
(45) Date of Patent: Oct. 23, 2007

(54) METHOD AND APPARATUS FOR THE CONTROL OF A SPRAYING APPARATUS

(75) Inventor: Göran Sundholm, Tuusula (FI)

(73) Assignee: Marioff Corporation Oy, Vantaa (FI)

( * ) Notice: Subject to any disclaimer, the term of this patent is extended or adjusted under 35 U.S.C. 154(b) by 0 days.

(21) Appl. No.: 10/511,938

(22) PCT Filed: Apr. 16, 2003

(86) PCT No.: PCT/FI03/00302

§ 371 (c)(1),
(2), (4) Date: Oct. 19, 2004

(87) PCT Pub. No.: WO03/089776

PCT Pub. Date: Oct. 30, 2003

(65) Prior Publication Data

US 2005/0211195 A1    Sep. 29, 2005

(30) Foreign Application Priority Data

Apr. 19, 2002    (FI) ............................... U20020754

(51) Int. Cl.
*F02M 25/028* (2006.01)
(52) U.S. Cl. .................................. 123/25 A
(58) Field of Classification Search ............. 123/25 A, 123/25 B, 25 C, 25 D, 25 J
See application file for complete search history.

(56) References Cited

U.S. PATENT DOCUMENTS

| 3,107,657 | A |   | 10/1963 | Cook |           |
|-----------|---|---|---------|------|-----------|
| 3,779,213 | A | * | 12/1973 | Knudsen | ........... 123/1 R |
| 4,240,380 | A |   | 12/1980 | Slagle |          |
| 4,377,135 | A |   | 3/1983  | Abthoff et al. | |
| 4,438,731 | A | * | 3/1984  | Maggio | ........... 123/25 N |
| 4,448,153 | A |   | 5/1984  | Miller |          |
| 4,461,245 | A |   | 7/1984  | Vinokur |         |
| 4,494,596 | A |   | 1/1985  | Bradshaw |        |
| 4,558,665 | A | * | 12/1985 | Sandberg et al. | ......... 123/25 C |
| 4,960,080 | A |   | 10/1990 | O'Neill et al. | |
| 5,125,366 | A | * | 6/1992  | Hobbs | ........... 123/25 C |
| 5,125,377 | A |   | 6/1992  | Mezheritsky |    |

(Continued)

FOREIGN PATENT DOCUMENTS

DE    43 03 256    8/1994

(Continued)

*Primary Examiner*—Stephen K. Cronin
*Assistant Examiner*—Hyder Ali
(74) *Attorney, Agent, or Firm*—Ladas & Parry LLC

(57) ABSTRACT

A method and apparatus controls intake air humidification spraying with at least two spraying nozzles (1a, 1b, 1c, 1d) for spraying a liquid into the intake air. When an amount of the liquid to be supplied through the spraying nozzles increases, liquid flow passages are opened for more nozzles (1a, 1b, 1c, 1d) and/or the liquid flow is directed into a flow passage leading to one of the spraying nozzles that permits a larger liquid flow per unit of time than another of the spraying nozzles, and when an amount of the liquid to be supplied through the nozzles decreases, liquid flow channels are closed at least for one of the spraying nozzles (1a, 1b, 1c, 1d) and/or the liquid flow is directed to one of the spraying nozzles that permits a smaller liquid flow per unit of time than another of the spraying nozzles.

31 Claims, 3 Drawing Sheets

U.S. PATENT DOCUMENTS 5,497,628 A    3/1996   Stueble
5,566,655 A    10/1996  Rumez et al.
5,620,503 A    4/1997   Miller et al.

FOREIGN PATENT DOCUMENTS

| | | |
|---|---|---|
| DE | 196 01 325 | 7/1997 |
| EP | 0 683 307 | 11/1995 |
| EP | 1205659 A2 * | 5/2002 |
| FI | 116157 | 9/2005 |
| JP | 03018618 A * | 1/1991 |
| WO | 98/58705 | 12/1998 |

* cited by examiner

METHOD AND APPARATUS FOR THE CONTROL OF A SPRAYING APPARATUS

BACKGROUND OF THE INVENTION

The present invention relates to a method as defined in the preamble of claim 1 for controlling a spraying apparatus, especially A spraying apparatus designed for the humidification of the intake air of a piston engine.

The invention also relates to an apparatus as defined in the preamble of claim 14.

The exhaust gases of piston engines, in particular diesel engines, contain many kinds of noxious combustion products. At the high combustion temperatures, the combustion process in the cylinders of a piston engine produces nitrogen oxides (NOx), which are emitted together with the exhaust gases into the atmosphere. Because of the harmful environmental effects of nitrogen oxide emissions, efforts are undertaken to minimize their production.

As is known, adding water to the combustion process reduces the generation of nitrogen oxides. This phenomenon is based on the cooling effect of water. In practice, the introduction of water into the combustion process is often implemented by injecting water into the intake air. These arrangements are advantageous in respect of efficiency of the engine. The maximum amount of water introduced into the combustion space of the engine may advantageously be that amount which will remain in gaseous form in the intake air pressure and temperature conditions.

The object of the invention is to achieve a completely new type of control system that allows the intake air to be humidified in a desired manner in different engine load conditions.

Another object of the invention is to achieve a control apparatus that allows the humidification of intake air in different engine load conditions.

The method of the invention is characterized in that, in accordance with the control system's instructions, when the required amount of water to be supplied through the nozzles increases, liquid flow passages are opened for more nozzles and/or the liquid flow is directed to a nozzle that permits a larger liquid flow through it per unit of time, and when the required amount of water to be supplied through the nozzles decreases, liquid flow passages are closed at least for some of the nozzles and/or the liquid flow is directed to a nozzle that permits a smaller liquid flow through it per unit of time.

The method of the invention is additionally characterized by what is stated in claims 2-13.

The apparatus of the invention is characterized by what is stated in claims 14-25.

The solution of the invention has numerous significant advantages. By applying the method of the invention, a very accurate control of a spraying apparatus can be easily achieved using a relatively economical pump unit. By providing the spraying head with nozzles having different properties, the amount and/or characteristics of the water mist to be injected can be varied in a desired manner by opening and closing the medium channels leading to different nozzles in the spraying head. By providing a constant-output pump and a return line whose k-value always corresponds to the k-values of the closed nozzles, a system is achieved in which the sum of the k-values is always substantially constant. By using a pressure medium to control the valves in the return line, the number of solenoid valves needed can be reduced. The pressure medium used for the control of the return line valves and/or a second pressure medium can be circulated to the nozzles to keep them clean when no liquid to be injected is passed through them.

BRIEF DESCRIPTION OF THE FIGURES

In the following, the invention will be described in detail by the aid of an example with reference to the attached drawings, wherein.

DETAILED DESCRIPTION OF THE INVENTION

Figure 2:
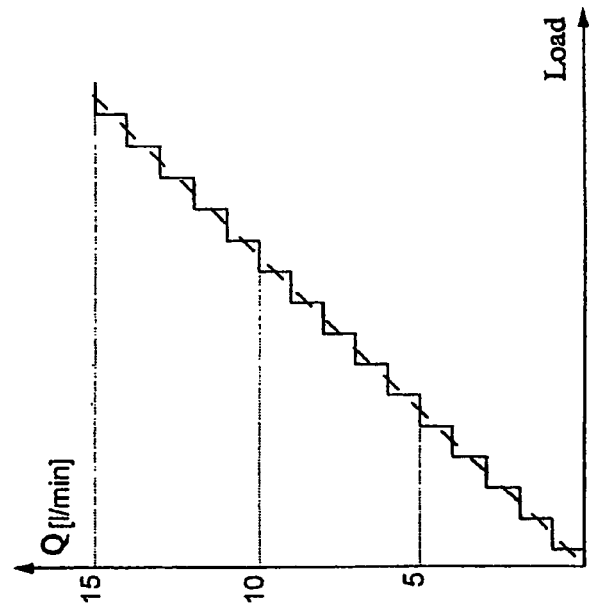
FIG. 2 illustrates the supply of a liquid quantity per unit of time as a function of engine load in the apparatus of the invention.
Figure 1:
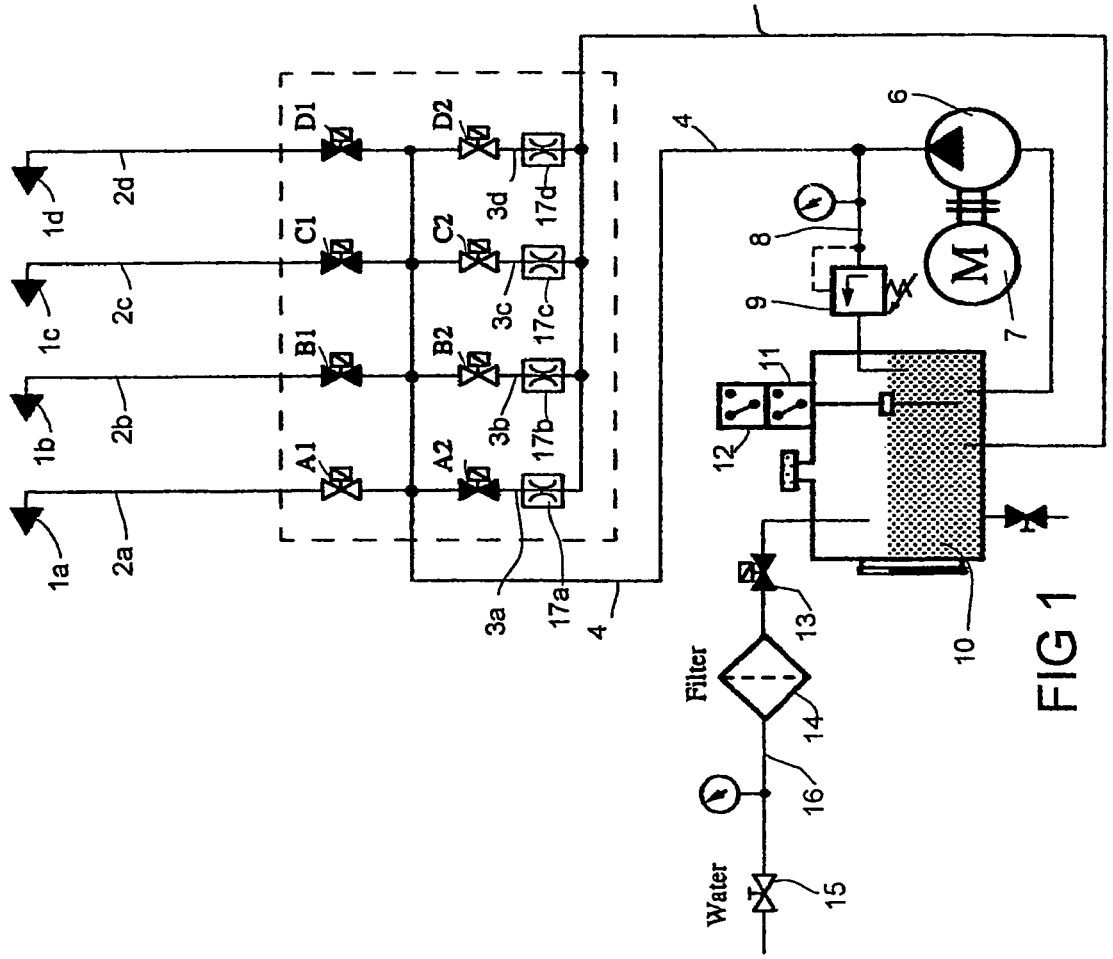
FIG. 1 presents a diagram representing an apparatus according to the invention.

FIG. 1 presents a diagram representing the method and system of the invention in diagrammatic form. The system comprises at least two nozzles 1a, 1b, 1c, 1d, which are disposed in the engine's air intake duct or in a corresponding space leading to the combustion chamber of the engine for humidification of the intake air. In the case presented in the figure, four nozzles are shown, with a channel 2a, 2b, 2c, 2d leading to each nozzle from a supply pipe 4 supplying a pressure medium, preferably an aqueous liquid. The pressure medium is fed into the supply pipe by a pump 6, driven by a drive device 7. The pump pumps the pressure medium from a pressure medium source 10, such as tank. Reference numbers 8 and 9 indicate a pipe and a relief valve through which the liquid can flow in case the pump pressure and the pressure in pipe 8 exceed a certain presettable limit value. Reference numbers 13 and 15 indicate valves, and reference number 14 indicates a filter. The filter prevents particles that could clog the valves 1a, 1b, 1c, 1d of the spraying head from entering the spraying system. When the liquid surface in the container 10 falls below a certain level, a level switch 11 will open valve 13. Switch 24 will close the valve when the water level in the container 10 has risen to a given height.

The pump 6 is preferably a constant-output pump which always pumps the same amount Q of pressure medium per unit of time into the supply pipe 4 when running. The pump drive 7 is preferably a motor, such as an electrically operated direct-current motor, which drives the pump at a constant speed. The channels 2a, 2b, 2c, 2d leading to the nozzles are provided with valve elements A1, B1, C1, D1, which can be opened and closed as instructed by the control system. The control system typically controls the valves A1, B1, C1, D1 according to the required amount of liquid to be sprayed, preferably according to the engine load, so the amount of liquid supplied into the intake air typically increases with the engine load. The system comprises a return pipe 5, through which the liquid quantity not fed into the intake air returns to the tank 10. Disposed between the supply pipe 4 and the return pipe 5 are valve elements A2, B2, C2, D2, which can be opened and closed as instructed by the control system. For each closed feed channel 2a, 2b, 2c, 2d leading to the nozzles 1a, 1b, 1c, 1d, a corresponding channel 3a, 3b, 3c, 3d opening into the return pipe 5 is provided. If all the nozzle feed channel valves A1, B1, C1, D1 are open, then the valves A2, B2, C2, D2 in the flow passages leading to the return pipe 5 are closed, and vice versa. The sum of the k-values of the return channels substantially corresponds to the sum of the k-values of the closed nozzles and those of their feed channels. In the embodiment represented by the figure, each channel 3a, 3b, 3c, 3d leading into the return pipe 5 is provided with a throttle element, which is adjusted to match the k-value of the nozzle in closed state. Thus, the sum of the k-values in the system remains substantially constant. In the case of FIG. 1, valve element A1 in the feed channel 2a leading from the supply pipe to valve 1a is open, thus allowing the liquid to flow to the nozzle. The valves B1, C1, D1 in the feed channels leading to the other valves are closed, thus preventing liquid flow to valves 1b, 1c, 1c. Correspondingly, valve A2 in the channel 3a leading to the return pipe 5 is closed, preventing liquid flow through channel 3a into the return pipe. Valves B2, C2, D2 in the other channels 3b, 3c, 3d arranged between the supply pipe and the return pipe are open, permitting the liquid to flow through them into the return pipe 5. The channels are provided with a throttling 17b, 17c, 17d or equivalent, which corresponds to the k-values of the closed nozzles. By providing nozzles having different characteristics and different flow rate capacities, a very large control range can be covered accurately. In the case of FIG. 1, by using a pump with an output capacity of 15 l/min, where nozzle 1a has an output of 1 l/min, nozzle 1b an output of 2 l/min, nozzle 1c an output of 4 l/min and nozzle 1d an output of 8 l/min, the entire range of 1-15 l/min can be covered by opening and closing the valves. The pressure is typically constant in the system. When the engine load increases, the amount of liquid flowing into the intake air through the nozzles is increased by increasing the number of nozzles and/or by selecting a nozzle that permits a larger liquid quantity to flow through it in a unit of time. When the engine load decreases, the amount of liquid flowing through the nozzles supplying liquid into the intake air is reduced by reducing the number of nozzles and/or by selecting a nozzle that permits a smaller amount of liquid to flow through it in a unit of time. In connection with the above-described operation, the amount of water supplied into the return pipe by the "by-pass" route is correspondingly adjusted in inverse proportion to the amount of water fed through the nozzles. In a corresponding manner, the throttling is adjusted so that at least when liquid is being injected into the intake air in the system, the sum of the k-values ($\Sigma k$) remains substantially constant regardless of whether the liquid is passed through the nozzles or through the return pipe or whether a portion of the liquid quantity is passed through the nozzles and another portion, substantially the rest of it through the return pipe. The flow rate for a nozzle is given by the formula $Q=k\sqrt{p}$, where Q is the flow rate, p is the pressure forcing the medium through the nozzle and k is the nozzle resistance. The value of the factor k depends on the area of the nozzle aperture, among other things. In the case of circular aperture, the value of the factor k depends on the aperture diameter d according to the equation $k=0.78*d^2$ when the aperture is a so-called short aperture. The resistance of the return pipe is adapted to correspond to the resistance of the closed nozzles.

Figure 3:
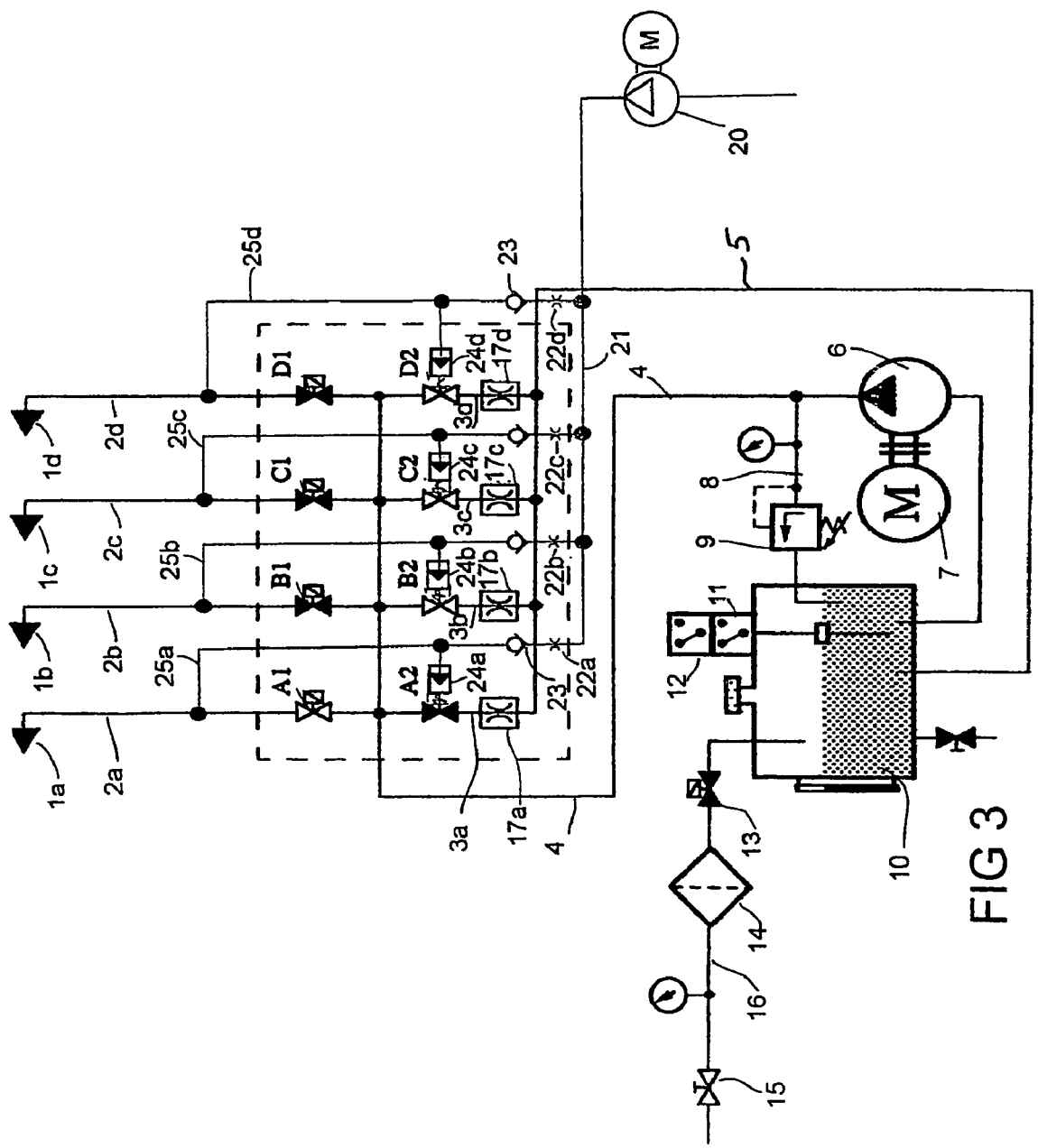
FIG. 3 presents a second embodiment of the solution of the invention in diagrammatic form.

FIG. 3 presents a second embodiment of the apparatus of the invention. In this case, a second pressure medium source 20, e.g. pump unit for pumping pressurized air is provided in connection with the spraying apparatus. The second pressure medium is supplied through a supply pipe 21 into the channel 2a, 2b, 2c, 2d leading to the nozzles 1a, 1b, 1c, 1d via second feed channels 25a, 25b, 25c, 25d. The feed channels 25a, 25b, 25c, 25d are connected to the channels leading to the nozzles at a point between valve elements A1, B1, C1, D1 and the nozzles 1a, 1b, 1c, 1d. The second valves A2, B2, C2, D2 arranged in connection with the channels leading to the return line 5 are controlled using the pressure of the first pressure medium. When the control system gives a signal and at least one of the first valve elements A1, B1, C1, D1 is opened, the first pressure medium, typically water to be injected can enter into the second feed channel 25a, 25b, 25c, 25d arranged between the valves and the nozzles. The pressure medium can act on the regulator 24a, 24b, 24c, 24d controlling the second valve element A2, B2, C2, D2, this pressure being greater than the spring load of the regulator, with the result that at least one of the valve elements is closed. A second pressure medium, such as a liquid or gas or a mixture of these, is supplied through the feed channels 25a, 25b, 25c, 25d to the nozzles not in use. The pressure of the second pressure medium is typically lower than the pressure of the first pressure medium in the supply pipe 4. Therefore, when first valve element is opened, the first pressure medium can enter the second supply pipe regardless of the pressure of the second pressure medium acting there. Each one of the second feed channels 25a, 25b, 25c, 25d is provided with a check valve 23 to prevent the first pressure medium from entering the second supply pipe 21. After the nozzle has stopped spraying, the system works in the converse manner. Thus, when the first valve element is closed, the pressure in the second supply channel falls, with the result that the spring force in the regulator of the second valve exceeds the counter-force of the pressure medium and opens the second valve element. The second pressure medium is now able to flow into the second feed channel, forcing the first pressure medium remaining there to flow before it into the nozzle. The second pressure medium is allowed to flow through the nozzle, thus preventing the nozzles from becoming clogged in the air intake duct. The pressure of the second pressure medium in the piping is e.g. 6 bar. The force produced by the spring element of the regulator of the second valve element corresponds to a pressure of e.g. 10 bar, so the second valve element will close when the pressure in the second feed channel exceeds 10 bar. Naturally, instead of a spring element, other elements capable of corresponding operation may also be used.

A method for controlling a spraying apparatus, especially a spraying apparatus designed for the humidification of intake air, said apparatus comprising at least two spraying nozzles 1a, 1b, 1c, 1d for injecting liquid into the intake air. In accordance with the control system's instructions, when the required amount of liquid to be supplied through the nozzles increases, liquid flow passages are opened for more nozzles 1a, 1b, 1c, 1d and/or the liquid flow is directed into a flow channel leading to a nozzle that permits a larger liquid flow through it per unit of time, and when the required amount of liquid to be supplied through the nozzles decreases, liquid flow channels are closed at least for some of the nozzles and/or the liquid flow is directed to a nozzle that permits a smaller liquid flow through it per unit of time. A substantially constant amount of liquid per unit of time is fed into the supply pipe 4 and at least a portion of the liquid quantity supplied that is not directed to the nozzles is conveyed into the return pipe 5. The pressure in the supply pipe 4 is kept substantially constant, regardless of the number of spraying head nozzles. The k-value (resistance) of at least one of the channels leading into the return pipe 5 is adjusted to make it correspond to the k-value (resistance) of the closed nozzles. The sum of the activated (open) k-values is maintained at a substantially constant value. The liquid to be fed into the return line is conveyed through at least one return channel 3a, 3b, 3c, 3d into the return pipe. The return channel 3a, 3b, 3c, 3d is provided with at least one valve element A2, B2, C2, D2, which is controlled on the basis of impulses given by the control system. In at least one return channel 3a, 3b, 3c, 3d, a throttle element 17a, 17b, 17c, 17d or equivalent having a k-value adapted to correspond to the k-value of the at least one closed nozzles is used. The amount of liquid to be supplied through the nozzles 1a, 1b, 1c, 1d is adjusted as a function of the engine load. Through the nozzles 1a, 1b, 1c, 1d, a liquid mist, especially a water mist is Injected. The liquid mist is injected at a pressure of 10-300 bar. The maximum droplet size of the liquid mist injected is typically 200 micrometers. A second medium is conveyed to the nozzle when in it is in closed state to prevent clogging of the nozzle.

An apparatus for supplying a liquid mist into the intake air of an engine, said apparatus comprising at least two nozzles for injecting a liquid mist into the air intake duct. The apparatus comprises at least two feed channels 2a, 2b, 2c, 2d provided with valve elements A1, B1, C1, D1, a control system, which gives impulses on the basis of which the aforesaid valve elements are opened and closed, liquid supply means 4, 6, 10 for supplying an aqueous liquid into a feed channel 2a, 2b, 2c, 2d leading to at least one nozzle. The apparatus further comprises an outlet pipe 5 and at least one outlet channel 3a, 3b, 3c, 3d, through which a connection to the outlet pipe from the supply pipe 4 leading to the nozzles can be opened and closed. The outlet channel 3a, 3b, 3c, 3d is provided with a valve element A2, B2, C2, D2, which has been arranged to close when the corresponding valve element A1, B1, C1, D1 in the feed channel 2a, 2b, 2c, 2d leading to the nozzle opens and to open when the valve element in the corresponding feed channel leading to the nozzle closes. The apparatus comprises means for keeping the flow resistance (sum of k-values) constant. The apparatus comprises a number of feed channels 2a, 2b, 2c, 2d leading to the nozzles and a corresponding number of return channels 3a, 3b, 3c, 3d as well as valve elements for each feed channel and return channel, each feed channel-return channel pair being controlled together so that when the feed channel opens, the return channel closes and vice versa. The return channels are provided with a throttle element 3a', 3b', 3c', 3d' or equivalent. The liquid supply means comprise a liquid source 10 and a pump 6. The control system has been adapted to control the apparatus on the basis of engine load. The apparatus comprises means 20, 21, 25a, 25b, 25c, 25d for conveying a second pressure medium to a nozzles 1a, 1b, 1c, 1d whose feed channel is in closed state to prevent clogging of the nozzle.

At least one spraying head 1a, 1b, 1c, 1d of the spraying apparatus is connected directly to the air intake duct structures, and a fine mist produced by the spraying head comprising at least one nozzle is produced directly into the intake air in the air intake duct. When the solution of the invention is used, no extra chambers or other containers are needed in the air intake ductwork. The nozzles feed water mist under a high pressure into the air intake duct. The pressure is typically over 10 bar, preferably over 30 bar, most preferably over 50 bar. The pressure may be typically between 10-300 bar. The water is In the form of a fine mist. Preferably 50% of the water volume (Dv50) is in the form of droplets having a size typically below 200 micrometers, preferably below 100 micrometers and more preferably below 50 micrometers. Under high load conditions, the droplet size may be larger.

The nozzles in the spraying head may have different properties, which have been adapted according to the placement of each nozzle. The form of the spraying head, the number of nozzles and their orientation may vary depending on the application. It is also possible to supply different mediums to the nozzle, such as water and gas. The figure does not show the nozzles in detail, but they may be replaceable depending on the application.

Figure 4:
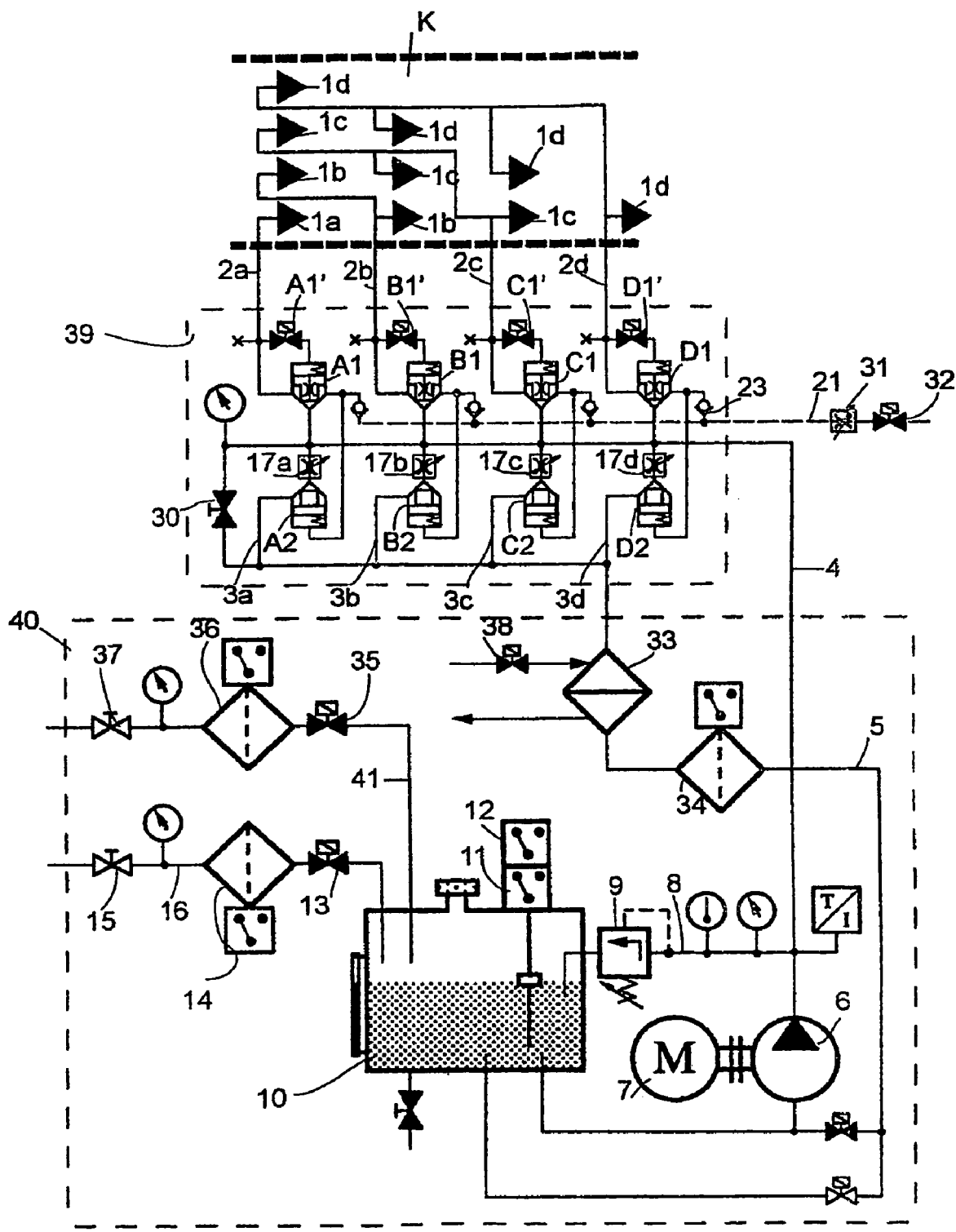
FIG. 4 presents a third embodiment of the solution of the invention in diagrammatic form.

FIG. 4 presents yet another solution according to the invention. It comprises nozzles 1a, 1b, 1c, 1d arranged in feed channels 2a, 2b, 2c, 2d, each channel having a different number of nozzles placed at different positions in the air intake duct K. In this embodiment, too, the valve elements A1-A2, B1-B2, C1-C2, D1-D2 controlling the liquid flow going into the nozzle feed channels 2a, 2b, 2c, 2d and the return channel 3a, 3b, 3c, 3d are controlled in pairs. These valve element pairs are most appropriately controlled by means of solenoid valves A1', B1', C1', D1'. The return channels are provided with variable throttles 17a, 17b, 17c, 17d, by means of which the flow can be adjusted as desired. Correspondingly, the pressure can also be varied by opening and closing the throttle elements in the return channel. In this embodiment, the valve elements and throttles are arranged as control blocks, indicated in the figure by the number 39 and a broken line. This embodiment likewise comprises a nozzle cleaning system, in which a pressure medium, such as pressurized air, is supplied from a pressure medium source via a pipeline 21 by means of a pump. The pressure medium supply line 21 of the cleaning system is provided with a variable throttle element for the control of the flow. The control system further comprises a temperature regulating system, whereby the temperature of the liquid to be injected can be adjusted. The system comprises a heat exchanger element 33 arranged in the return line 5, to which heat can be supplied via a line and valve 38. When a small amount of liquid is to be injected, most of the liquid quantity supplied by the pump returns back via the return line. The pressure is at least partly converted to heat as it passes through the throttle elements 17a-17d, the liquid entering the return line being thus heated. From the return line, at least some of the liquid can be conveyed directly to the pump 6 or into the tank 10. In this case, the heat exchanger element 33 may be superfluous because the system itself generates sufficient heat in the liquid. For example, in low-load conditions, if only 10% of the pump output Is passed into the intake air, as much as 90% of the power of the pump motor will be transferred for heating the liquid. Similarly, the heat exchanger 33 may also recover heat and transfer it to another part. In the system, it is possible to obtain heat for the liquid to be sprayed even without a heat exchanger. The return line 5 is also preferably provided with a filter element 34 for removing impurities from the liquid.

The nozzles are therefore of a type such that they produce a jet of fine mist when fed with liquid under a high pressure. Many kinds of nozzles of this category are known, e.g. from fire extinguishing technology employing water mist. For example, specifications WO 92/20454 and WO 94/06567 disclose nozzles that produce a water mist at a high pressure. Naturally, other types of nozzles may also be used, e.g. specification WO 01/45799 discloses yet another nozzle.

The amount of water supplied through the nozzles typically increases with increasing engine load. Thus, when the engine load is low, it is possible to supply water only to some of the nozzles and increase the number of spraying nozzles when the load increases. Similarly, the spraying head can be provided with nozzles having different properties, such as flow rate, droplet size produced by the nozzles, etc. It is thus possible to form different combinations, which can be adapted to a wide range of different applications, different engine types, different placements and conditions.

The apparatus of the invention is able to make full use of the quantity of heat required for the vaporization of the water, cooling the intake air at each injection point to a temperature close to the wet bulb temperature (or adiabatic saturation temperature, which in the case of a water-air mixture is practically the same thing), i.e. to the temperature to which it is possible to reduce the air temperature by vaporization of water.

Thus, the humidity of the gas entering the cylinder and therefore the formation of nitrogen oxides is controlled within desired limits.

It is obvious to the person skilled in the art that the invention is not limited to the embodiments described above, but that it may be varied within the scope of the claims presented below.

The invention claimed is:

1. In a method controlling intake air humidification spraying apparatus, the apparatus comprising at least two spraying nozzles (1a, 1b, 1c, 1d) for spraying a liquid into the intake air, the method improvements characterized in that,
when an amount of the liquid to be supplied through the spraying nozzles increases, liquid flow passages are opened for more nozzles (1a, 1b, 1c, 1d) and/or the liquid flow is directed into a flow passage leading to one of the spraying nozzles that permits a larger liquid flow per unit of time than another of the spraying nozzles, and when an amount of the liquid to be supplied through the nozzles decreases, liquid flow channels are closed at least for one of the spraying nozzles (1a, 1b, 1c, 1d) and/or the liquid flow is directed to one of the spraying nozzles that permits a smaller liquid flow per unit of time than another of the spraying nozzles, and
a substantially constant amount of liquid per unit of time is fed into a supply pipe (4) for the spraying nozzles and at least a portion of the liquid quantity supplied that is not directed to the nozzles is conveyed into a return pipe (5).

2. Method according to claim 1, characterized in that a constant pressure is maintained in the supply pipe (4), regardless of the number of the spraying nozzles spraying.

3. Method according to claim 1 characterized in that the k-value (resistance) of at least one of the channels leading into the return pipe (5) is adjusted to make it correspond to the k-value (resistance) of the spraying nozzles in closed state.

4. Method according to claim 1, characterized in that the value of the sum of the activated (open) k-values is kept substantially constant.

5. Method according to claim 1, characterized in that the liquid to be fed into the return line is conveyed through at least one return channel (3a, 3b, 3c, 3d) into the return pipe.

6. Method according to claim 5, characterized in that the return channel (3a, 3b, 3c, 3d) is provided with at least one valve element (A2, B2, C2, D2), which is controlled on the basis of impulses given by the control system.

7. Method according to claim 5, characterized in that, in the at least one return channel (3a, 3b, 3c, 3d), a throttle element (17a, 17b, 17c, 17d) or equivalent having a k-value adapted to correspond to the k-value of the at least one closed one of the spraying nozzles is used.

8. Method according to claim 1, characterized in that the amount of liquid to be supplied through the spraying nozzles (1a, 1b, 1c, 1d) is adjusted as a function of the engine load.

9. Method according to claim 1, characterized in that a liquid mist is sprayed through the spraying nozzles (1a, 1b, 1c, 1d).

10. Method according to claim 1, characterized in that the liquid mist is injected at a pressure of 10-300 bar.

11. Method according to claim 1, characterized in that the maximum droplet size of the liquid mist injected is typically 200 micrometers.

12. Method according to claim 1, characterized in that a second medium is conveyed to the spraying nozzles when in it is in closed state to prevent clogging of the spraying nozzle.

13. In apparatus supplying a liquid into intake air of an engine, the improvements comprising:
at least two spraying nozzles for spraying a liquid as a mist into a duct for the intake air;
at least two feed channels (2a, 2b, 2c, 2d) with valve elements (A1, B1, C1, D1) respectively leading to the spraying nozzles;
a control system giving impulses on the basis of which the valve elements are opened and closed;
liquid supply means (4, 6, 10) for supplying the liquid into the feed channels (2a, 2b, 2c, 2d); and
an outlet pipe (5) and at least one outlet channel (3a, 3b, 3c, 3d), through which a connection to the outlet pipe from the supply pipe (4) leading to the nozzles can be opened and closed.

14. Apparatus according to claim 13, characterized in that the outlet channel (3a, 3b, 3c, 3d) is provided with a valve element (A2, B2, C2, D2) arranged to close when the corresponding valve element (A1, B1, C1, D1) in the feed channel (2a, 2b, 2c, 2d) leading to the nozzle opens and to open when the valve element in the corresponding feed channel leading to the nozzle closes.

15. Apparatus according to claim 13, characterized in that the apparatus comprises means for keeping the flow resistance (sum of k-values) constant.

16. Apparatus according to claim 13, characterized in that the apparatus comprises a number of feed channels (2a, 2b, 2c, 2d) leading to the nozzles and a corresponding number of return channels (3a, 3b, 3c, 3d) as well as valve elements for each feed channel and return channel, each feed channel—return channel pair being controlled together so that when the feed channel opens, the return channel closes and vice versa.

17. Apparatus according to claim 13, characterized in that the return channels are provided with a throttle element (3a', 3b', 3c', 3d') or equivalent.

18. Apparatus according to claim 13, characterized in that the liquid supply means comprise a liquid source (10) and a pump (6).

19. Apparatus according to claim 13, characterized in that the control system has been adapted to control the apparatus on the basis of engine load.

20. Apparatus according to claim 13, characterized in that the apparatus comprises means (33) for regulating the temperature of the first pressure medium.

21. Apparatus according to claim 13, characterized in that the apparatus comprises means (20, 21, 25a, 25b, 25c, 25d) for conveying a second pressure medium to a nozzle (1a, 1b, 1c, 1d) whose feed channel is in closed state, to prevent clogging of the nozzle.

22. Apparatus according to claim 13, characterized in that it comprises means (34, 36, 14) for filtering at least the first pressure medium.

23. In apparatus supplying a liquid into intake air of an engine, the improvements comprising:
at least two spraying nozzles for spraying a liquid as a mist into a duct for the intake air;

at least two feed channels (2a, 2b, 2c, 2d) with valve elements (A1, B1, C1, D1) respectively leading to the spraying nozzles;

a control system giving impulses on the basis of which the valve elements are opened and closed;

liquid supply means (4, 6, 10) for supplying the liquid into the feed channels (2a, 2b, 2c, 2d); and an outlet channel (3a, 3b, 3c, 3d) is provided with a valve element (A2, B2, C2, D2) arranged to close when the corresponding valve element (A1, B1, C1, D1) in the feed channel (2a, 2b, 2c, 2d) leading to the nozzle opens and to open when the valve element in the corresponding feed channel leading to the nozzle closes.

24. Apparatus according to claim 23, characterized in that the apparatus comprises means for keeping the flow resistance (sum of k-values) constant.

25. Apparatus according to claim 23, characterized in that the apparatus comprises a number of feed channels (2a, 2b, 2c, 2d) leading to the nozzles and a corresponding number of return channels (3a, 3b, 3c, 3d) as well as valve elements for each feed channel and return channel, each feed channel—return channel pair being controlled together so that when the feed channel opens, the return channel closes and vice versa.

26. Apparatus according to claim 23, characterized in that the return channels are provided with a throttle element (3a', 3b', 3c', 3d') or equivalent.

27. Apparatus according to claim 23, characterized in that the liquid supply means comprise a liquid source (10) and a pump (6).

28. Apparatus according to claim 23, characterized in that the control system has been adapted to control the apparatus on the basis of engine load.

29. Apparatus according to claim 23, characterized in that the apparatus comprises means (33) for regulating the temperature of the first pressure medium.

30. Apparatus according to claim 23, characterized in that the apparatus comprises means (20, 21, 25a, 25b, 25c, 25d) for conveying a second pressure medium to a nozzle (1a, 1b, 1c, 1d) whose feed channel is in closed state, to prevent clogging of the nozzle.

31. Apparatus according to claim 23, characterized in that it comprises means (34, 36, 14) for filtering at least the first pressure medium.

* * * * *